(No Model.)
C. J. B. GAUME, Dec'd.
C. Gaume, Administratrix.
GAS ENGINE.
No. 501,881. Patented July 18, 1893.
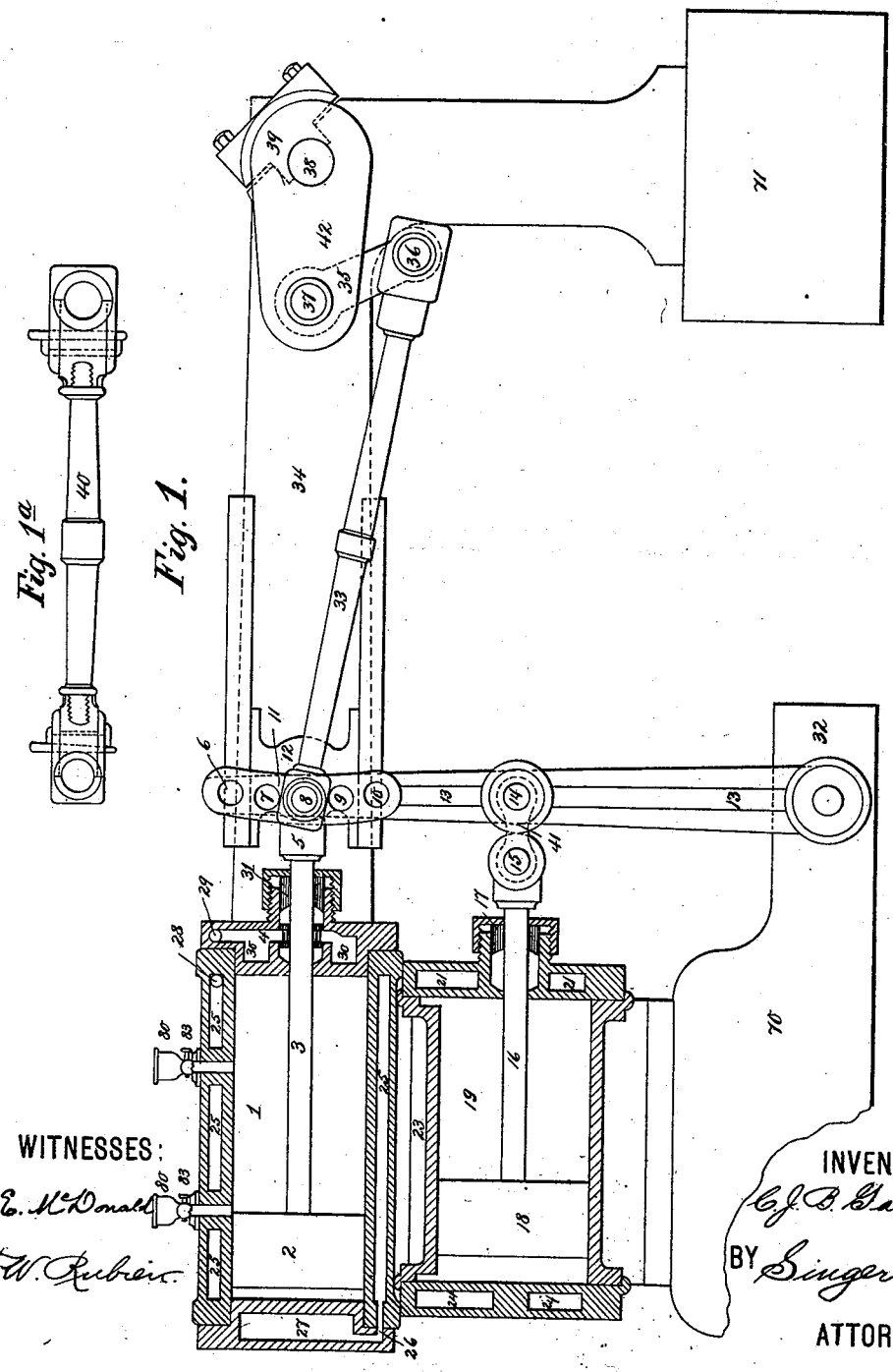
WITNESSES:
C. E. McDonald
F. W. Rubein
INVENTOR
C. J. B. Gaume,
BY Singer & Ebner
ATTORNEYS.

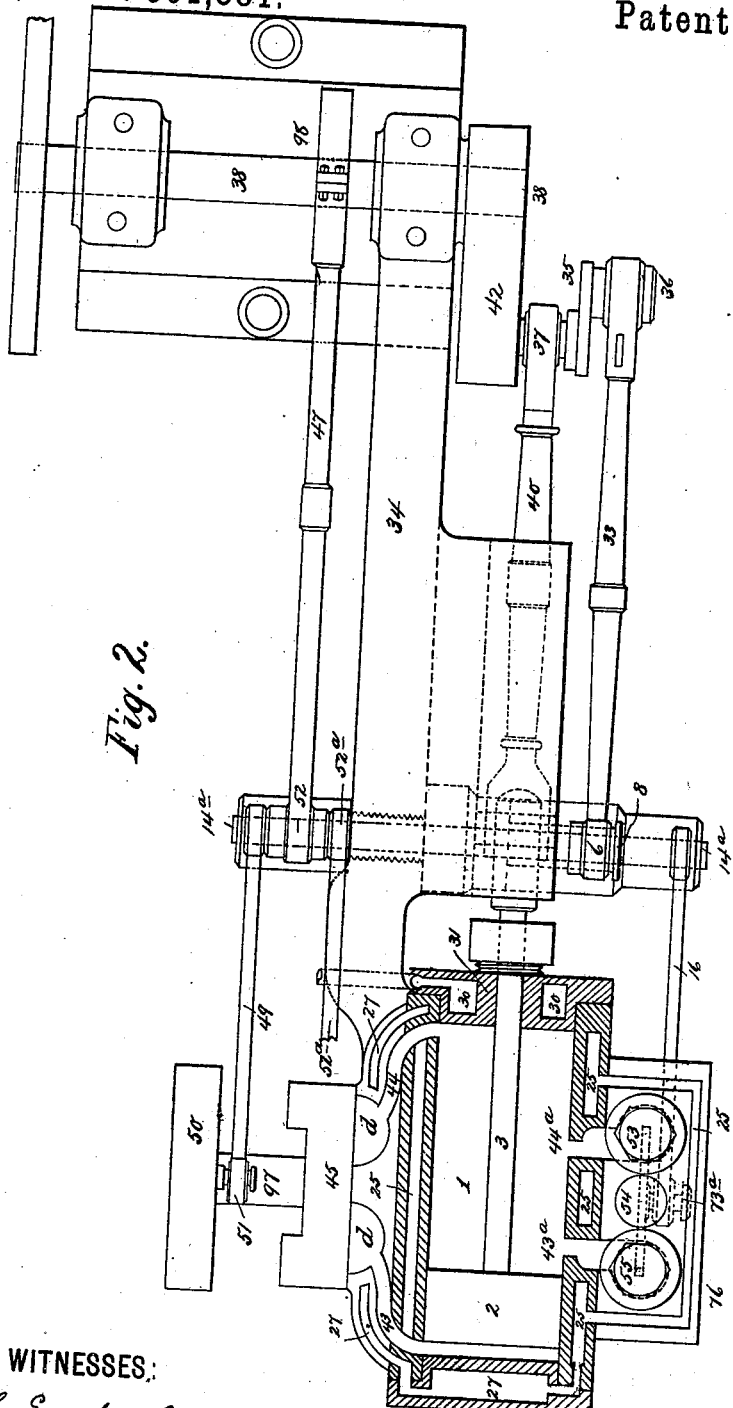

(No Model.) 5 Sheets—Sheet 3.
C. J. B. GAUME, Dec'd.
C. GAUME, Administratrix.
GAS ENGINE.
No. 501,881. Patented July 18, 1893.
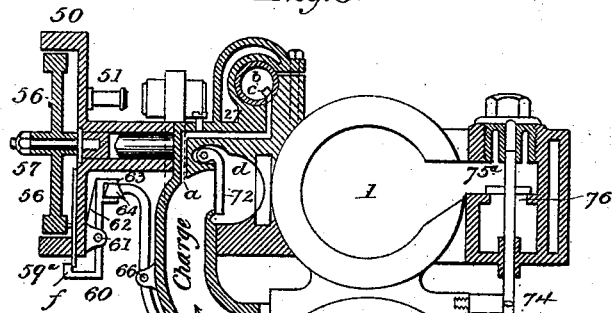
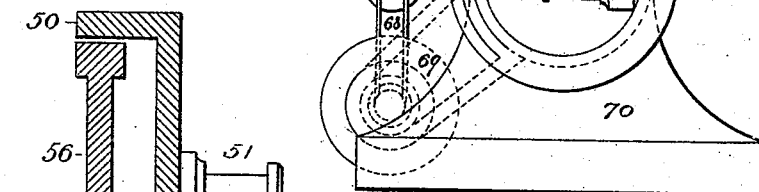
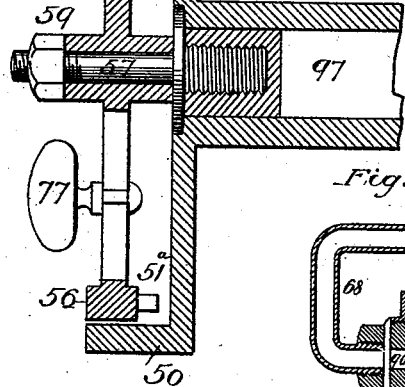
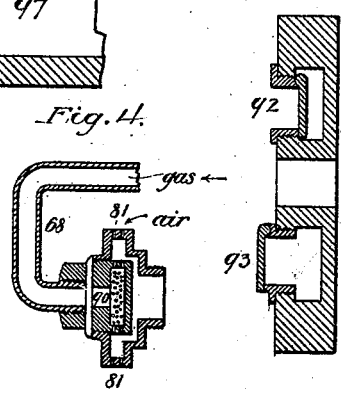
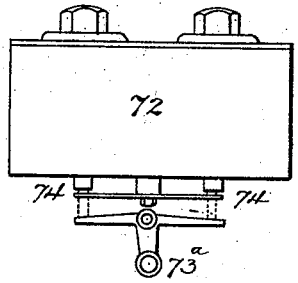
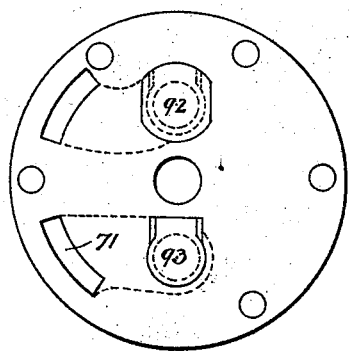
Witnesses:
Fred McDonald
J Whittle
Inventor:
Cicele Gaume Admx,
Chas J. B. Gaume Decd
By P. E. McDonald
Attorney (No Model.)
C. J. B. GAUME, Dec'd.
C. GAUME, Administratrix.
GAS ENGINE.
No. 501,881.
5 Sheets—Sheet 4.
Patented July 18, 1893.
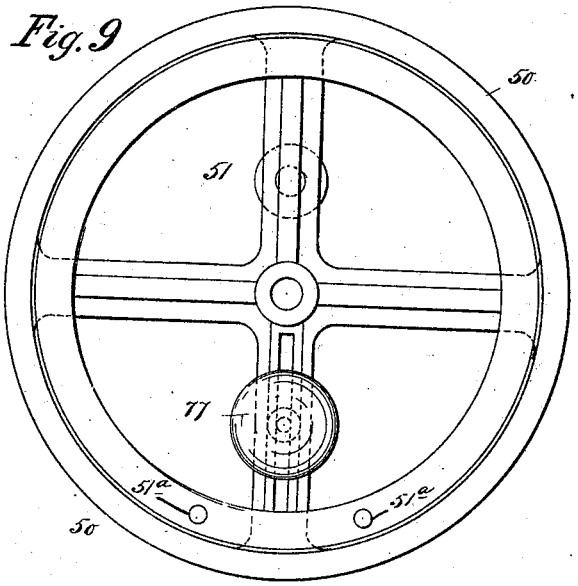
Fig. 9
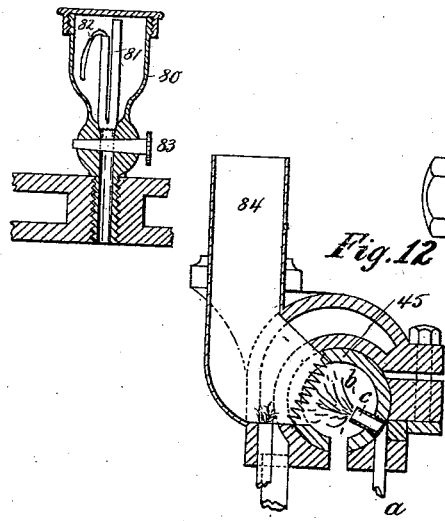
Fig. 10.
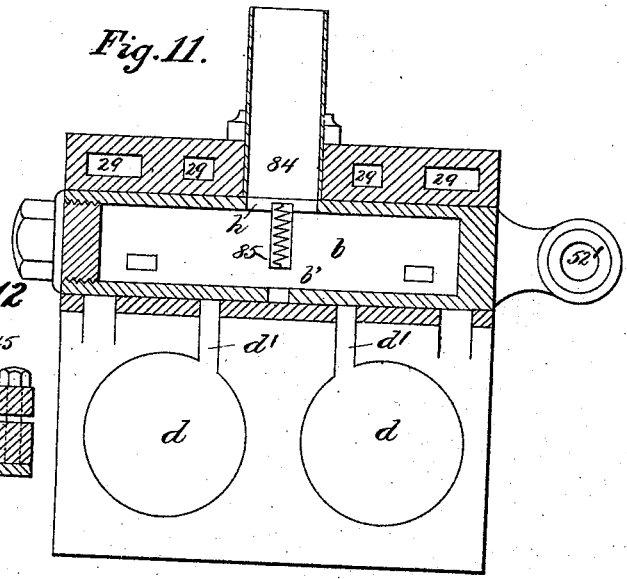
Fig. 11.
Fig. 12
WITNESSES:
C. E. McDonald
F. W. Rubien
INVENTOR
C. J. B. Gaume,
BY Singer & Ober
ATTORNEYS.

(No Model.) 5 Sheets—Sheet 5.
C. J. B. GAUME, Dec'd.
C. GAUME, Administratrix.
GAS ENGINE.
No. 501,881. Patented July 18, 1893.
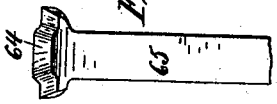
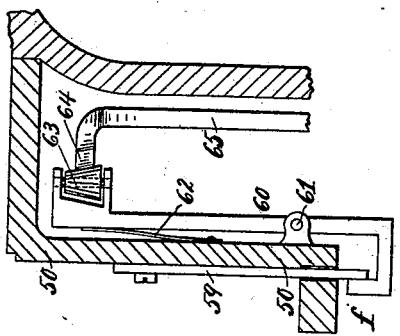
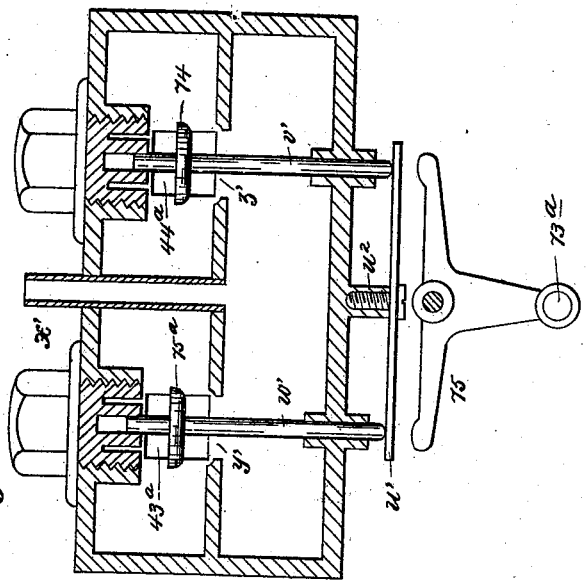
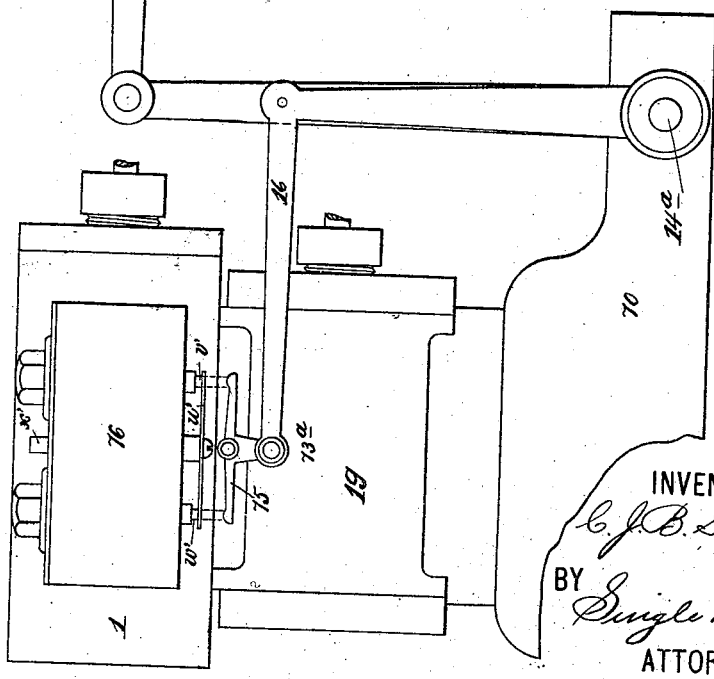
WITNESSES:
F. W. Rubien
C. E. McDonald
INVENTOR
C. J. B. Gaume
BY
Singer & Ebner
ATTORNEYS.

UNITED STATES PATENT OFFICE.

CHARLES J. B. GAUME, OF BROOKLYN, NEW YORK; CECILE GAUME ADMINIS-
TRATRIX OF SAID CHARLES J. B. GAUME, DECEASED.

GAS-ENGINE.

SPECIFICATION forming part of Letters Patent No. 501,881, dated July 18, 1893.

Application filed June 7, 1889. Serial No. 313,517. (No model.)

*To all whom it may concern:*

Be it known that I, CHARLES J. B. GAUME, a citizen of the United States, and a resident of the city of Brooklyn, in the county of Kings and State of New York, have invented a new and useful Improvement in Gas-Engines, of which the following is a specification.

The nature of the invention consists in the details of combination and construction substantially as illustrated in the accompanying drawings, hereinafter described, and subsequently pointed out in the claims.

Figure 1. is a vertical sectional view, of my newly invented gas engine, taken on a plane parallel to, and through the axis of the cylinder. Fig. 1$^a$. is a detail view illustrating the connecting rod which connects the cross head and the main crank. Fig. 2. is a view of my newly invented gas engine, partly in plan, and partly in section, the section being taken on a horizontal plane parallel to, and passing through the axis of the cylinder. Fig. 3, is another vertical sectional view of the same, taken through the middle of the cylinder, transversely to the axis thereof, illustrating the governor, and the interior of the exhaust and firing box. Fig. 4, is a detail sectional view illustrating the gas and air inlet. Figs. 5 and 6. are detail views illustrating the same. Fig. 7. is a detail view illustrating the exhaust mechanism. Figs. 8. and 9. are detail views illustrating the governor. Fig. 10. is a detail sectional view illustrating the oiling apparatus. Figs. 11. and 12. are detail views illustrating the firing box. Fig. 13, is a detail view of the exhaust and some of its accompanying mechanism. Fig. 14. is a sectional view of the exhaust and some of its accompanying mechanism. Fig. 15. is a detail view of part of the mechanism of the governor. Fig. 16. is a view of one end of the lever 65. of the governor.

1. designates the cylinder, 2. the piston, 3. the piston rod, 12. the cross head, 34. the shears, 38. the main shaft, 42. the main crank, 40. the connecting rod, and 70. and 71. the pedestals on which the engine stands. These are of the construction and arrangement illustrated in the drawings.

Upon the main crank 42. is mounted an auxiliary crank 35. This crank actuates the connecting rod 33., which in its turn actuates the lever 13. This is an oscillating lever pivoted to the pedestal 70. at 32. and in order to vary the length of its stroke the holes 6. 7. 8. 9. and 10. are provided to either of which the end of the connecting rod 33. may be shifted, and there secured by a convenient pin.

19. designates a pump, which in the example of my invention here given, is placed directly under the cylinder.

18. designates the piston, and 16. the piston rod of this pump.

41. designates a link, attached by one end to the oscillating lever 13. at 14. and by the other end to the piston rod 16. at 15. and thus a connection is formed whereby the piston of the pump 19. is actuated. A convenient packing box 17. is provided.

The entry and exit of the pump are designated respectively by 92. and 93. A tube 68. conveys gas to the perforated plate 90. At the same time air entering through the openings 81. 81. is mixed with the comminuted gas, and drawn together with it, through the entry 92. into the pump. On the return stroke of the piston, this charge of mixed gas and air is forced out through the exit 93. and the conduit 71, past the valve 72, through the chamber $d$. and into the cylinder. A part of the mixture however, passes from the conduit 71. through the smaller conduit $a$. to feed the burner $c$. in the chamber $b$. of the firing box 45, which heats the wire coil 85. This firing apparatus is constructed with a hollow sliding chamber $b$. which communicates with the outlet 84. by the opening $h$. and with the conduits $d'$. $d'$. through the port $b'$. A shell or case surrounds this chamber which is chambered for water jackets 27.

Upon the main shaft 38. is mounted an eccentric 98. The eccentric rod 47. by means of the joint 52. connects the yoke of this eccentric with an oscillating lever. This lever is similar to lever 13.; but is on the opposite side of the engine, and is pivoted to the pedestal of the engine. A rock shaft 14$^a$. passing through this lever actuates the connecting rods 16. 49. and 52$^a$. The rod 52$^a$. connects the eye 52'. of the sliding chamber $b$. and the said rock shaft 14$^a$., so that as the eccentric 98 is revolved by the shaft 38. the chamber $b$. will be slipped backward and forward, as hereinafter described.

The governor is constructed as follows: 50. designates a shell wheel which oscillates on the spindle 97. Another wheel, concentric with the said wheel 50, is mounted upon the spindle 57. which if it be desired may be a prolongation of the spindle 97. The shell wheel 50. is propelled by the rod 49. connecting the pin 51. with the rock shaft $14^a$. On the under side of the rim of the wheel 56. are placed two pins $51^a$. These are arranged one on either side of the spring $59^a$. This spring is placed in a position radial to the said shell wheel, and is by its inner end attached to the said wheel. With its outer end it holds up the nose $f$. of the bell crank lever 60. This lever which is pivoted at 61. is actuated by the spring 62. Upon the inner end of this lever is mounted a roller designated by 63. This roller rolls upon the curve shaped end 64. of the lever 65. This lever 65, is pivoted at 66. and presses with its lower end on the stem $e$. of the valve 67. This valve may be of any approved style and construction, so that it is adapted to open and close, with the oscillations of the lever 65, as hereinafter described. This is the gas entry valve. A movable weight 77. is adjustably fixed upon one spoke of the wheel 56. to regulate its motion.

The exhaust is designated by 76. It is connected with the cylinder 1. by the ports $43^a$ and $44^a$, and the two valves 74. and $75^a$. These valves are arranged so that one of them connects with either end of the cylinder, and are placed in either end of the exhaust as illustrated.

$u'$. designates a flat metallic bar pivoted in its middle, to the exhaust, and arranged so that when it is in the position illustrated in Fig. 14. it will hold both valves open to give facility for starting the engine. But when this bar $u'$, is swung away from under the valve stems $w'$, $v'$, the valves 74. and $75^a$. will fall into their seats $y'$ and $z$. and will be alternately raised and let fall by the lever 75. which is attached by the pin $73^a$ to the bell crank 16. This bell crank is pivoted on the rocking shaft $14^a$.

Water spaces designated by 21, 23, 24, 25, 26, 27, and 30, are provided by means of which water flowing in at 29. circulates around the cylinder, the exhaust, the firing box, and the pump, and finally flows out at 28, through a proper conductor.

The box 4. of the piston rod 3. consists of two packing rings held together by intermediate posts so that the water in the space 30. flowing between these intermediate posts, comes upon a naked part of the piston rod and keeps it cool.

The oil cups 80. are provided with a wick and wick sheath 82. and an open tube connecting the inside of the cup and the interior of the cylinder, so that at all times the pressure inside of the cup, and inside of the cylinder will be the same, and the wick will not be liable to be blown out by any sudden increase of pressure. A stop-cock 83. is provided by which the oil may be let on or shut off as may be required.

When the exhaust has been opened as before described, on both sides, the fly wheel, which is of the common form, and therefore, as it does not form any part of my invention is not here shown, may be very easily turned around to bring the first charge of gas and air into the cylinder. This first comes into the pump through the entry 92. as hereinbefore described. From the pump it passes out through the exit 93., through the conduit 71. into the chambers $d$. past the valves 72. and thence through the conduits 43, and 44. into the cylinder. There are two chambers $d$. and two corresponding valves 72. and two corresponding conduits 71. These chambers and valves are so arranged with regard to the cylinder, that only one end of the cylinder takes a charge at a time, in a way somewhat like an ordinary steam engine. This is accomplished by arranging said valves 72. so that they open in the same directions. As the charge comes into one end of the cylinder, the piston is receding from that end, and until the piston has reached the end of its stroke, the charge continues to flow in. But as soon as the piston begins its return stroke, the compression of the charge in the cylinder causes so much pressure that the valve 72. is closed, and the connection of the chamber $d$. with the conduit 71, cut off, so that for the time being nothing can pass. When the piston has traveled on its return stroke to the proper position, the chamber $b$. having been moved by the mechanism before described, brings the port $b'$. over the proper conduit $d'$. to communicate with the charged end of the cylinder. At once a part of the charge rushing through the port $b'$. into the chamber $b$. comes upon the wire coil 85. which is in the mean time heated as before described. This immediately explodes the mixture of gas and air with which one end of the cylinder, the said conduits and the said chamber are charged. And this explosion acting on the piston gives it the proper impulse to propel the mechanism. During this time the exhaust is closed; but as the piston turns to the return stroke after the explosion, the exhaust is opened, by the above described mechanism, and the products of the explosion expelled from the cylinder. The same thing occurs with the opposite end of the cylinder, in the same way; but alternating with the operation just described. And thus the piston receives its impulses alternately on opposite sides. The wheel 56. is loosely mounted on the spindle 97, its hub bearing a little on the hub of the shell wheel 50. During the ordinary speed of the engine this wheel 56, is at, or very nearly at rest. But as soon as a greater flow of gas increases the speed of the engine, the increased rapidity of the oscillations of the shell wheel 50, will, by reason of the friction at the hub, cause the wheel 56, to also oscillate. This brings the spring 59, into contact with one of the pins 51ª which knocks the spring from under the nose $f$, of the lever 60. The roller 63, on the other end of this lever, with every oscillation of the wheel 50 rolls on the curved end 64, of the lever 65. The internal pressure is such, while the engine is in motion, that the valve 67, is closed, with its stem $e$. protruding out against the lower end of the lever 65. As the roller 63, moves on the curved surface, of the end 64, of the lever 65, it, on account of the lever 60 being held in position by the spring 59., oscillates the lever 65, a little, so that the lower end of said lever, moving the valve stem $e$, intermittently opens the valve 67. for the entry of gas. But when as before described, the spring 59. has been knocked from under the end $f$, of the lever 60, the roller 63, moving on the curved surface 64, will not oscillate the lever 65, enough to open the valve 67, because the spring 59, no longer holds the said lever 60, in position, and so the supply of gas is shut off. As soon as the piston of the engine has made a few strokes and the speed has been diminished, the internal pressure of the valve 67, will be relaxed. Then the spring 62, will bring back the lever 60, into its original position. And then the oscillation of the wheel 50, carrying the spring 59, and the pins 51ª. pushing it will replace it under the nose $f$, of the lever 60, so that the engine will again resume its normal speed.

What I claim as my invention, and desire to secure by Letters Patent, is—

1. The combination in a gas engine with the cylinder thereof and a pump communicating therewith substantially as specified, of an oscillating lever operating the piston of said pump an auxiliary crank upon the revolving main shaft of said engine a connecting rod connecting said crank and said lever, to actuate said lever and means substantially as specified whereby the stroke of the said lever may be lengthened or made shorter, substantially as and for the purpose set forth.

2. In a gas engine, the combination with an oscillating shell wheel, pivoted to the frame of said engine, another wheel pivoted concentrically within said shell, pins upon said inner wheel, a spring attached to said shell and operated by said pins, a bell crank lever detained by said spring, another bent lever pivoted to the wall of said engine, detained at one end by the said last named lever, and with the other end operating the gas entry valve of said engine, and a gas entry valve for said engine, operated by said lever, of a connecting rod, connecting said oscillating shell wheel and a rock shaft, an oscillating lever, pivoted to the pedestal of said engine and said rock shaft carried thereby, an eccentric wheel upon the main shaft of said engine a yoke upon said eccentric wheel and a connecting rod connecting said eccentric yoke and said oscillating lever, all substantially as and for the purpose set forth.

3. In a gas engine the combination with the cylinder and pump of said engine, of a sliding chamber within a shell or case, said chamber being capable of communication with both said cylinder and said pump, a gas burner within the said chamber, and a coil of wire within the blaze of said burner, of a rock shaft, an oscillating lever, pivoted to the pedestal of said engine, and carrying the said rock shaft, an eccentric wheel upon the main shaft of said engine a yoke upon said eccentric, a connecting rod connecting said eccentric yoke and said oscillating lever, and a connecting rod, connecting said sliding chamber, and said rock shaft, all substantially as and for the purpose set forth.

4. In a gas engine the combination with an exhaust chamber communicating by two ports, with the cylinder of said engine, of a double valve substantially as specified, working in said chamber an oscillating lever pivoted to the pedestal of said engine, a rock shaft carried by said lever, an eccentric wheel and yoke mounted upon the main shaft of said engine, a connecting rod connecting said yoke and an oscillating lever to operate said oscillating lever, a connecting rod connecting said rock shaft and a pivoted bar, substantially as described to hold up said exhaust valve, and arranged to afford facility for starting said engine, substantially as and for the purpose set forth.

In testimony that I claim the foregoing as my invention I have signed my name, in presence of two witnesses, this 29th day of May, 1889.

CHARLES J. B. GAUME.

Witnesses:
 F. W. RUBEN,
 C. E. McDONALD.